United States Patent [19]

Procter

[11] Patent Number: 4,507,784
[45] Date of Patent: Mar. 26, 1985

[54] DATA PROCESSING SYSTEMS

[75] Inventor: Brian J. Procter, Broadbottom, England

[73] Assignee: International Computers Limited, London, United Kingdom

[21] Appl. No.: 495,802

[22] Filed: May 18, 1983

[30] Foreign Application Priority Data

May 21, 1982 [GB] United Kingdom ............... 8214961

[51] Int. Cl.³ ............................................. G06F 11/00
[52] U.S. Cl. .......................................... 371/61; 371/3
[58] Field of Search ................ 371/3, 61, 57, 49; 307/269

[56] References Cited

U.S. PATENT DOCUMENTS

| | | | |
|---|---|---|---|
| 4,081,662 | 3/1978 | Pehrson et al. | 371/61 |
| 4,122,441 | 10/1978 | Robinson et al. | 371/61 X |
| 4,144,448 | 3/1979 | Pisciotta et al. | 371/61 |
| 4,328,583 | 5/1982 | Stodola | 371/57 |
| 4,342,112 | 7/1982 | Stodola | 371/3 X |
| 4,392,226 | 7/1983 | Cook | 371/61 |
| 4,468,768 | 8/1984 | Sunkle et al. | 371/3 X |

Primary Examiner—Charles E. Atkinson
Attorney, Agent, or Firm—Lee, Smith & Zickert

[57] ABSTRACT

A data processing system consists of a number of modules such as integrated circuit chips, each of which receives a clock signal. Each module contains a checking circuit producing a failure signal which indicates whether or not the module is operating correctly. The clock signal is used to invert the sense of this failure signal in successive clock periods. Thus, the failure signal normally alternates between two values in successive clock periods, and its phase relative to the clock signal denotes whether or not a failure has been detected. However, if the clock supply to a module fails, or if the checking circuit itself fails, the failure signal from that module no longer alternates, but is frozen at one or other of the two values. This allows failure of the clock supply or of the checking circuit to be detected.

12 Claims, 4 Drawing Figures

DATA PROCESSING SYSTEMS

BACKGROUND TO THE INVENTION

This invention relates to data processing systems and more specifically is concerned with arrangements for monitoring the operation of such systems.

One known method of monitoring a data processing system is by using parity checking to detect failures in individual circuits such as registers. Checking may be carried out in each of a number of separate modules and the results of the individual checks may be combined in a central monitoring unit.

One limitation of known checking arrangements is that they are not normally capable of detecting failure of the clock signal supply to a module. If the clock signal fails while the contents of the registers in the module are all correct, the registers remain in this correct state and hence the check continues to indicate correct operation. One object of the invention is to overcome this limitation.

Another problem which arises in known checking arrangements is that the failure signal produced by a checking circuit may itself fail, and this may result in a false indication that the module is operating correctly.

SUMMARY OF THE INVENTION

According to the present invention, there is provided a data processing system comprising a plurality of modules, each module comprising:

(a) means for receiving a clock signal for controlling the timing of the module, (b) checking means for monitoring the operation of the module and producing a failure signal to indicate whether or not the module is operating correctly, and (c) means responsive to the clock signal for inverting the sense of the failure signal in successive clock periods.

It can be seen that if the clock signal supply to one of the modules fails, the sense of the failure signal from that module will no longer be inverted in successive clock periods, and this provides an indication that the clock signal supply has failed.

In a preferred form of the invention, the sense of the failure signal is inverted by applying an alternating signal, derived from the clock signal, to one input of the checking means. Thus, if the checking circuit fails, the sense of the failure signal will no longer alternate as expected and the failure will be detectable.

In one particular form of the invention, the checking means may be a parity checking circuit. However, the invention is also applicable to other forms of self-consistency checking.

One data processing system in accordance with the invention will now be described by way of example with reference to the accompanying drawings.

DESCRIPTION OF AN EMBODIMENT OF THE INVENTION

Figure 1:
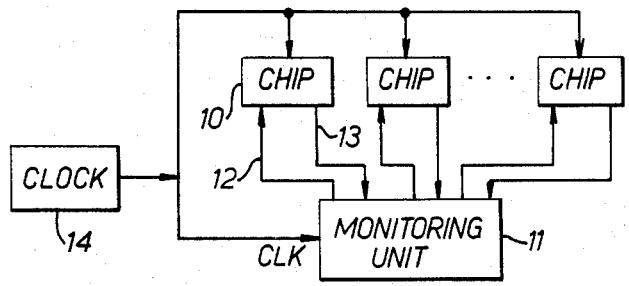
FIG. 1 is an overall view of the data processing system.

Referring to FIG. 1, the system comprises a plurality of large-scale integrated circuit (LSI) chips 10, each of which contains processing circuits and monitoring circuits. The processing circuits include various registers for storing partial results, data and so on. The processing circuits, and the manner in which they are interconnected, form no part of the present invention and so will not be described herein. The system also includes a central monitoring unit 11 connected to each chip 10 by a serial input path 12 and a serial output path 13. Each of the chips 10 and also the monitoring unit 11 receives a clock signal CLK from a clock circuit 14.

Figure 2:
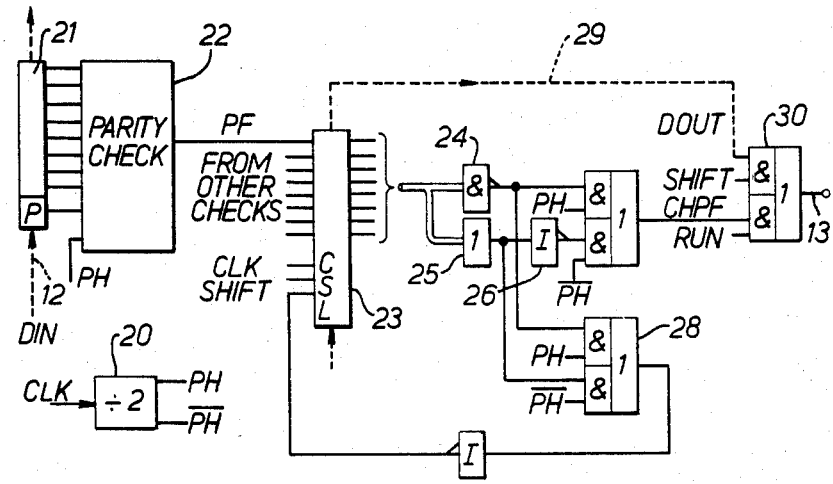
FIG. 2 is a circuit diagram of one chip forming part of the system.

Referring to FIG. 2, each chip 10 contains a divide-by-two circuit 20 which receives the clock signal CLK and produces a control signal PH and its inverse $\overline{PH}$, the value of which alternate between high and low logic levels in successive clock periods. The monitoring unit 11 also contains a similar divide-by-two circuit (not shown). In normal operation, in the absence of any failures, all the signals PH in the chips 10 and the monitoring unit 11 are synchronised with each other. However, if the clock supply to any chip fails, the signal PH in that chip becomes frozen at a constant value.

FIG. 2 shows one of the registers 21 forming part of the processing circuits on the chip. This register contains eight data bits and one parity bit P, which is set to a value such as to give an odd number of binary ones in the register. The contents of the register 21, including the parity bit, are fed to a parity checking circuit 22 along with the control signal PH The parity checking circuit is shown in more detail in FIG. 3. The circuit consists of a tree network of equivalence gates. The five gates 31 on the left of the figure receive the eight data bits, the parity bit P, and the control signal PH. The gate 32 on the right of the figure produces an output parity fail signal PF. It can be seen that in normal operation, in the absence of any parity failure, the parity fail signal PF alternates in polarity in successive clock periods, being equal to the control signal PH. In the event of a parity failure, the signal PF still alternates, but is now equal to the inverse of PH. If the parity circuit itself fails, such that the output of the gate 32 is stuck at a high or low logic level, or if the clock supply to the chip fails, the parity fail signal PF no longer alternates.

Referring again to FIG. 2, the parity fail signal PF is stored in a register 23 along with similar signals from other parity checking circuits (not shown) on the same chip. The register 23 is clocked by the signal CLK, so that normally its contents are updated every clock period. It can be seen that, in normal operation, when there is no failure on the chip, the contents of the register will alternate between all ones (when PH=1) and all zeroes (when PH=0).

The all-ones condition is detected by a NAND gate 24, and the all-zeroes condition is detected by an OR gate 25, the output of which is fed to an inverter 26. The output of the NAND gate 24 and the inverter 26 are fed to a data selector circuit 27, controlled by the signals PH and $\overline{PH}$. When PH=1, the circuit 27 selects the output of NAND gate 24, and when PH=0, it selects the inverted output of the OR gate 25. The selected signal provides an overall chip failure signal CHPF.

It can be seen that, in the absence of any failures on the chip, CHPF alternates in polarity in successive clock periods and is equal to the inverse of PH. However, if any of the bits of register 23 indicates a failure, CHPF is inverted. Also, if the clock supply to the chip fails, CHPF is frozen at a constant value.

The outputs of the gates 24,25 are also fed to another data selector circuit 28, the output of which is inverted and applied to the LOAD control input of register 23. In normal operation, the output of selector 28 remains low, and hence the register 23 is enabled to permit new information to be written into it at each clock period. However, if any of the bits in register 23 indicates a parity failure, the output of selector 28 goes high, and this inhibits any further loading of the register 23. The contents of register 23 are therefore frozen, and may be examined to determine the location of the failure.

All the registers on the chip (such as registers 21 and 23) normally act as parallel input/output registers, as required for their normal functions. However, each of these registers can be switched, by means of a control signal SHIFT, so as to act as a serial input/output shift register. The registers are all connected in series, a indicated by the dashed line 29. The serial input of the first register in the series receives a data input signal DIN from the serial input path 12 from the monitoring unit. The serial output of the last register in the series provides an output signal DOUT.

The chip fail signal CHPF and the data output signal DOUT are fed to respective inputs of a data selector circuit 30, the output of which is fed to the serial output path 13 leading to the monitoring unit 11. The circuit 30 selects CHPF in response to a control signal RUN, and selects DOUT in response to the control signal SHIFT.

In the normal processing mode of operation of the system, RUN=1 and SHIFT=0. Thus, in this mode, CHPF is returned to the monitoring unit, providing an indication of whether the chip is functioning correctly. Alternatively, the system can be placed in a diagnostic mode, by putting RUN=0 and SHIFT=1. In this case, the registers are all converted into shift registers, and the signal DOUT is returned to the monitoring unit. Thus, in this mode, test data generated by the monitoring unit can be shifted serially into the registers over the path 12, and the contents of the registers can be shifted out serially to the monitoring unit for inspection.

It should be noted that the path 13 carries two different signals DOUT and CHPF according to the selected mode of operation. These signals could have been transmitted over separate paths, but multiplexing them in this way saves the use of an extra pin on each chip.

Figures 3, 4:
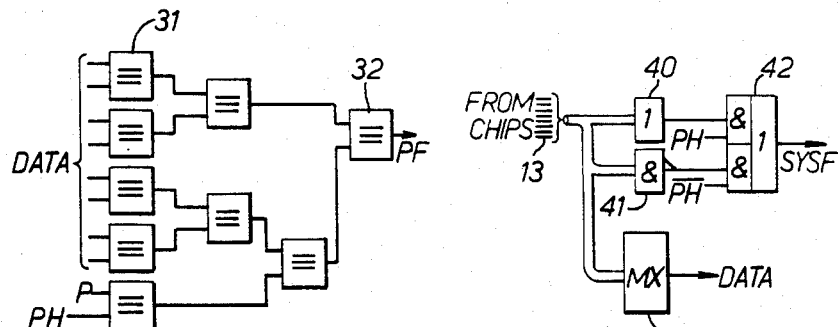
FIG. 3 is a circuit diagram of a parity checking circuit.
FIG. 4 is a circuit diagram of a central monitoring unit.

Referring now to FIG. 4, the monitoring unit 11 receives the signals on paths 13 from all the chips 10. The paths are connected to the inputs of an OR gate 40 and a NAND gate 41. The outputs of the gates 40, 41 are connected to respective inputs of a data selector circuit 42, which is controlled by the signals PH, $\overline{PH}$ generated locally in the monitoring unit.

In the normal processing mode of operation (RUN=1, SHIFT=0), the circuits 40,41,42 combine the CHPF signals from the individual chips 10 to produce an overall system failure signal SYSF which indicates whether there is a failure in any one of the chips. When there are no detected failures, the signals CHPF are all 0 when PH=1, and are all 1 when PH=0. Hence, SYSF will always be zero in this condition, However, if any failure occurs, either as the result of failure of a data bit in a register, or failure of a parity checking circuit, or failure of the clock supply to a chip, the signal SYSF will be 1.

In the diagnostic mode, the signal SYSF is ignored by the monitoring unit. Instead, the monitoring unit selects one of the paths 13 by means of a multiplexer 43, so as to examine the serial data output signal DOUT from the register of a selected chip.

I claim:

1. A data processing system comprising a plurality of modules, each module comprising:
   (a) means for receiving a clock signal for controlling the timing of the module,
   (b) checking means for monitoring the operation of the module and producing a failure signal to indicate whether or not the module is operating correctly, and
   (c) means responsive to the clock signal for inverting the sense of the failure signal in successive clock periods.

2. A system according to claim 1 wherein the means for inverting the sense of the failure signal in successive clock periods comprises:
   (a) means responsive to the clock signal for producing a control signal which alternates between opposite binary values in successive clock periods, and
   (b) means for applying the control signal to one input of the checking means.

3. A system according to claim 2 wherein said checking means is a parity checking circuit.

4. A system according to claim 1 wherein each said module is an integrated circuit chip.

5. A system according to claim 1 wherein each module includes a plurality of checking means for producing a plurality of individual failure signals, and means for combining the individual failure signals to produce an overall failure signal for the module.

6. A system according to claim 5 including means responsive to the clock signal for inverting the sense of each individual failure signal in successive clock periods.

7. A system according to claim 6 wherein the means for combining the individual failure signals comprises a first gate for sensing when all the failure signals are at one binary level, a second gate for sensing when all the failure signals are at the opposite binary level, and a data selector for selecting the outputs of the first and second gates during alternate clock periods.

8. A system according to claim 1 further comprising means for combining the failure signals from the modules to produce an overall system failure signal.

9. A system according to claim 8 wherein the means for combining the failure signals from the modules comprises a first gate for sensing when all the failure signals are at one binary level, a second gate for sensing when all the failure signals are at the opposite binary level, and a data selector for selecting the outputs of the first and second gates during alternate clock periods.

10. A system according to claim 1 wherein each module comprises:
    (a) a plurality of internal registers,
    (b) means operative in response to a mode control signal to link all the registers together to form a shift register with a serial data output, and
    (c) a data selector, for selecting either the failure signal or the serial data output for output from the module.

11. A data processing module, comprising
    (a) means for receiving a clock signal for controlling the timing of the module, (b) checking means for monitoring the operation of the module and producing a failure signal to indicate whether or not the module is operating correctly, and
(c) means responsive to the clock signal for inverting the sense of the failure signal in successive clock periods.

12. A data processing module comprising:
(a) means for receiving a clock signal for controlling the timing of the module,
(b) means responsive to the clock signal for producing an output signal which alternates between two values during successive clock periods in a predetermined phase relationship with the clock signal and which, upon failure of the clock supply to the module, becomes static at one of said values, and
(c) checking means for monitoring the operation of the module and operative, upon detection of a failure within the module, to invert the sense of said output signal, thereby shifting the phase relationship of the output signal relative to the clock signal.

* * * * *